(12) United States Patent
Martin

(10) Patent No.: US 9,788,225 B2
(45) Date of Patent: Oct. 10, 2017

(54) METHODS, APPARATUS AND COMPUTER PROGRAMS FOR USE IN MEASUREMENT REPORTING

(71) Applicant: AVAGO TECHNOLOGIES GENERAL IP (SINGAPORE) PTE. LTD., Singapore (SG)

(72) Inventor: Brian Martin, Farnham (GB)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 571 days.

(21) Appl. No.: 14/159,904

(22) Filed: Jan. 21, 2014

(65) Prior Publication Data

US 2014/0206329 A1    Jul. 24, 2014

(30) Foreign Application Priority Data

Jan. 18, 2013  (GB) .................................. 1300951.9

(51) Int. Cl.
*H04B 17/00* (2015.01)
*H04W 24/10* (2009.01)
*H04W 36/00* (2009.01)
*H04W 36/30* (2009.01)

(52) U.S. Cl.
CPC ........ *H04W 24/10* (2013.01); *H04W 36/0061* (2013.01); *H04W 36/30* (2013.01)

(58) Field of Classification Search
CPC .. H04W 24/10; H04W 36/30; H04W 36/0061
USPC ........................ 455/422.1, 434, 435.1, 67.11
See application file for complete search history.

(56) References Cited

U.S. PATENT DOCUMENTS

| 8,670,763 B1* | 3/2014 | Oroskar ............ H04W 36/0061 370/331 |
| 2009/0069012 A1* | 3/2009 | Tu ......................... H04W 36/30 455/436 |
| 2011/0177815 A1* | 7/2011 | Jeong .................... H04W 48/14 455/436 |
| 2012/0231782 A1* | 9/2012 | Hellander ............. H04W 24/10 455/422.1 |

FOREIGN PATENT DOCUMENTS

CN            102307370           1/2012

OTHER PUBLICATIONS

R1-110687;Interference Issues in Heterogeneous Networks for HSPA; Qualcomm Inc.;3GPP TSG WG1;Meeting #64; Taipei, Taiwan;Feb. 21-25, 2011(12 pages).

* cited by examiner

*Primary Examiner* — Charles Appiah
*Assistant Examiner* — Jaime Holliday
(74) *Attorney, Agent, or Firm* — Oblon, McClelland, Maier & Neustadt, L.L.P.

(57) ABSTRACT

In measurement reporting in a cellular telecommunications network, a measurement control message is generated, the measurement control message specifying at least one measurement event for configuring reporting of measurements by at least one wireless device operating in a cell of the cellular telecommunications network. The at least one measurement event is configured with a neighbour list that is specific to the at least one measurement event. The measurement control message is transmitted for receipt by the wireless device.

19 Claims, 5 Drawing Sheets

METHODS, APPARATUS AND COMPUTER PROGRAMS FOR USE IN MEASUREMENT REPORTING

TECHNICAL FIELD

The present invention relates to methods, apparatus and computer programs for use in measurement reporting in a cellular telecommunications network.

BACKGROUND

The following abbreviations which may be found in the specification and/or the drawing figures are defined as follows:
3GPP Third Generation Partnership Project
CIO Cell Individual Offset
CPICH common pilot channel
CSG closed subscriber group
DCH dedicated channel
DL downlink
E-DCH enhanced uplink dedicated channel
E-UTRAN Evolved Universal Terrestrial Radio Access Network
HetNet heterogeneous network
HPN high power node
HS-DPCCH high speed dedicated physical control channel
HS-DSCH high speed downlink shared channel
HSDPA high speed downlink packet access
HSPA High Speed Packet Access
IE information element
ISCP interference on signal code power
LPN low power node
LTE Long Term Evolution
MR multiflow
RAT radio access technology
RSCP received signal code power
SHO soft handover
UL uplink
UMTS Universal Mobile Telecommunications System
UTRAN UMTS Terrestrial Radio Access Network Continuing expansion of mobile and other wireless communications is rendering the available radio spectrum more crowded and this trend is expected to increase in the near term as greater volumes of data are wirelessly exchanged. One recent approach to increase the ability of network operators to handle this increased traffic is to deploy so-called heterogeneous networks (or "HetNets"). In a heterogeneous network, there is at least one conventional cell, commonly termed macro cells or the like, and one or more smaller cells, sometimes termed micro, pico or femto or local cells or the like, which are (fully or partially) within the coverage area of the macro cell(s) and which operate with various levels of coordination with the macro cell(s). The smaller cell or cells can be used for example to extend the coverage area of the macro cell(s), either to extend range or to fill holes in coverage provided by the macro cell(s), and to improve capacity.

In a heterogeneous network or HetNet, a macro cell network node (which may for example be a base station of the macro cell) typically transmits with a much higher power than the network node(s) of the smaller cell(s), and so the macro cell coverage area is much larger than that of the smaller cell(s). Some HetNet deployments have the macro cell(s) and the smaller cell(s) on different frequency bands, such as a primary versus a secondary component carrier, whereas others have the one or more smaller cells operating on the same frequency band as the macro cell. The latter deployment where the frequency band is shared is sometimes referred to as a "co-channel HetNet" or similar.

In the Third Generation Partnership Project (3GPP) document R1-110687 entitled "Interference Issues in Heterogeneous Networks for HSPA" by Qualcomm Inc. (3GPP TSG WG1 Meeting #64; Taipei, Taiwan; 21-25 Feb. 2011), there is a discussion of some of the issues concerning co-channel HetNets. HSPA in the title refers to the High Speed Packet Access radio access technology which is a 3G enhancement, but the issues identified there are in general applicable to other radio access technologies, such as for example the Long Term Evolution (LTE) of the Evolved Universal Terrestrial Radio Access Network (E-UTRAN) technology. Introduction of the low power node(s) of the small cell(s) to the macro cell brings challenges in terms of reliability of the uplink (UL) control channel as well as interference management between the low power node(s) of the small cell(s) and the high power node or nodes of the macro cell. More specifically, an UL imbalance caused by the transmit power difference between the small and macro cell is discussed, which can cause unreliable UL control channel decoding in the serving cell when the serving cell is the macro cell (the control channel specifically being the high speed dedicated physical control channel (HS-DPCCH) in this document R1-110687); there can be excessive UL interference from the macro cell to the low power small cell; and there can be excessive UL interference in the other direction from the small cell to the macro cell.

More generally, there may be an uplink (UL) and/or a downlink (DL) imbalance in a HetNet arising from the transmit power difference between the low power network nodes of the small cell(s) and the high power network node(s) of the macro cell, which can give rise to various problems.

SUMMARY

According to a first aspect of the present invention, there is provided a method for use in measurement reporting in a cellular telecommunications network, the method comprising: generating a measurement control message, the measurement control message specifying at least one measurement event for configuring reporting of measurements by at least one wireless device operating in a cell of the cellular telecommunications network; wherein the at least one measurement event is configured with a neighbour list that is specific to the at least one measurement event; and transmitting the measurement control message for receipt by the wireless device.

Some examples of embodiments of the present invention enable a cell info list to be stored by a wireless device in which the cell info list is event-specific. In an example, a measurement event can be set up in which different parameters may be applied for the measurement event depending on for example the cell in which measurements are to be taken by the wireless device, or depending on for example the frequency on which measurements are to be taken by the wireless device, or both. It may be noted that, as discussed further below, in certain examples, parameters are not changed for existing cells in the neighbour list/cell info list, but one or more new cells are added and/or one or more cells in a cell info list stored by the wireless device are removed from that cell info list. Alternatively or additionally, at least one event-specific parameter may be applied for one or more existing cells in the neighbour list. The present invention has particular application to HetNets, but is not limited to HetNets and may be used in other cellular telecommunications network arrangements. As is known per se, in general a network may send a neighbour list specifying cells and frequencies, and the wireless device may store this information in a cell info list, such that to some degree these terms are used interchangeably.

In an embodiment, the at least one measurement event is further configured with at least one parameter that is specific to the at least one measurement event. In one example of this, the at least one parameter effectively overrides a corresponding parameter that is already stored by a wireless device that receives the measurement control message. The parameter may be specific to at least one cell in the neighbour list. Said at least one cell in the neighbour list may in an example be a neighbour cell of a cell that is currently the serving cell for the wireless device.

In an embodiment, generating a measurement control message comprises configuring the measurement event with a neighbour list that causes cells to be removed from a cell info list stored by a wireless device that receives the measurement control message. In one example of this, parameters stored by wireless device are not modified. In another example, parameters stored by wireless device are modified.

In an embodiment, generating a measurement control message comprises configuring the measurement event with a neighbour list that causes cells to be added to a cell info list stored by a wireless device that receives the measurement control message. In one example of this, parameters stored by wireless device are not modified. In another example, parameters stored by wireless device are modified.

In an embodiment, generating a measurement control message comprises configuring the measurement event with at least one parameter that is for use in measurement reporting in respect of cells that are not in a cell info list stored by a wireless device that receives the measurement control message. This enables one or more parameters to be given that apply to so-called detected set cells, i.e. cells that are outside the cell info list stored by the wireless device.

In an embodiment, the generating a measurement control message comprises generating a measurement control message that specifies plural measurement events for configuring reporting of measurements, wherein a first of said measurement events is configured with a neighbour list that is specific to said first measurement event, and a second of said measurement events is configured with a neighbour list that is specific to said second measurement event.

In an embodiment, said first measurement event is further configured with at least one parameter that is specific to said first measurement event and said second measurement event is further configured with at least one parameter that is specific to said second measurement event.

In an embodiment, the measurement control message comprises an information element that comprises at least one of (i) at least one event-specific parameter, (ii) a list of frequencies, and (iii) a list of cells, for at least one of intra-frequency measurements, inter-frequency measurements and inter-radio access technology measurements.

In an embodiment, the parameter includes at least one of cell individual offset, primary common pilot channel transmit power, a weighting factor, a minimum required received signal value in the cell, a minimum required quality level in the cell, and a maximum allowed uplink transmit power.

In an embodiment, said cellular telecommunications network comprises a heterogeneous network, wherein at least one cell in said heterogeneous network comprises a relatively high power network node, and at least one other cell in said heterogeneous network comprises a relatively low power network node with uplink and/or downlink coverage at least partially overlapping with said relatively high power node.

According to a second aspect of the present invention, there is provided apparatus for use in measurement reporting in a cellular telecommunications network, the apparatus comprising a processing system constructed and arranged to: generate a measurement control message, the measurement control message specifying at least one measurement event for configuring reporting of measurements by at least one wireless device operating in a cell of the cellular telecommunications network; wherein the at least one measurement event is configured with a neighbour list that is specific to the at least one measurement event; and cause the measurement control message to be transmitted for receipt by the wireless device.

According to a third aspect of the present invention, there is provided a computer program for use in measurement reporting in a cellular telecommunications network, the computer program comprising instructions such that when the computer program is executed by an apparatus, the apparatus is arranged to: generate a measurement control message, the measurement control message specifying at least one measurement event for configuring reporting of measurements by at least one wireless device operating in a cell of the cellular telecommunications network; wherein the at least one measurement event is configured with a neighbour list that is specific to the at least one measurement event; and cause the measurement control message to be transmitted for receipt by the wireless device.

According to a fourth aspect of the present invention, there is provided a method for use in measurement reporting in a cellular telecommunications network, the method comprising, at a wireless device: receiving a measurement control message, the measurement control message specifying at least one measurement event for configuring reporting of measurements by at least one wireless device operating in a cell of the cellular telecommunications network; the at least one measurement event being configured with a neighbour list that is specific to the at least one measurement event; and carrying out measurements according to the at least one measurement event.

In an embodiment, the at least one measurement event is further configured with at least one parameter that is specific to the at least one measurement event.

In an embodiment, the wireless device receives a measurement control message which comprises a neighbour list that causes cells to be removed from a cell info list stored by the wireless device.

In an embodiment, the wireless device receives a measurement control message which comprises a neighbour list that causes cells to be added to a cell info list stored by a wireless device that receives the measurement control message.

In an embodiment, the wireless device receives a measurement control message which comprises at least one parameter that is for use in measurement reporting in respect of cells that are not in a cell info list stored by the wireless device.

In an embodiment, the wireless device receives a measurement control message which specifies plural measurement events for configuring reporting of measurements, wherein a first of said measurement events is configured with a neighbour list that is specific to said first measurement event, and a second of said measurement events is configured with a neighbour list that is specific to said second measurement event.

In an embodiment, said first measurement event is further configured with at least one parameter that is specific to said first measurement event and said second measurement event is further configured with at least one parameter that is specific to said second measurement event.

In an embodiment, the measurement control message comprises an information element that comprises at least one of (i) at least one event-specific parameter, (ii) a list of frequencies, and (iii) a list of cells, for at least one of intra-frequency measurements, inter-frequency measurements and inter-radio access technology measurements.

In an embodiment, the parameter includes at least one of cell individual offset, primary common pilot channel transmit power, a weighting factor, a minimum required received signal value in the cell, a minimum required quality level in the cell, and a maximum allowed uplink transmit power.

In an embodiment, said cellular telecommunications network comprises a heterogeneous network, wherein at least one cell in said heterogeneous network comprises a relatively high power network node, and at least one other cell in said heterogeneous network comprises a relatively low power network node with uplink and/or downlink coverage at least partially overlapping with said relatively high power node.

In an embodiment, the wireless device uses plural cell info lists, each of said cell info lists specifying a different combination of an event for triggering reporting of measurements, at least one of a cell and a frequency on which measurements are to be taken, and a parameter therefor. One of the plural cell info lists may be for example an existing CELL_INFO_LIST which is used for reselection and legacy measurement types. The cell info lists may be pre-stored or formed dynamically.

In an embodiment, the method comprises reporting the results of the measurements to the network.

According to a fifth aspect of the present invention, there is provided apparatus for use in measurement reporting in a cellular telecommunications network, the apparatus comprising a processing system constructed and arranged to: receive a measurement control message, the measurement control message specifying at least one measurement event for configuring reporting of measurements by at least one wireless device operating in a cell of the cellular telecommunications network; the at least one measurement event being configured with a neighbour list that is specific to the at least one measurement event; and carry out measurements according to the at least one measurement event.

According to a sixth aspect of the present invention, there is provided a computer program for use in measurement reporting in a cellular telecommunications network, the computer program comprising instructions such that when the computer program is executed by a wireless device, the wireless device is arranged to: receive a measurement control message, the measurement control message specifying at least one measurement event for configuring reporting of measurements by at least one wireless device operating in a cell of the cellular telecommunications network; the at least one measurement event being configured with a neighbour list that is specific to the at least one measurement event; and carry out measurements according to the at least one measurement event.

There may be provided a non-transitory computer-readable storage medium comprising a set of computer-readable instructions stored thereon, which, when executed by a processing system, cause the processing system to carry out any of the methods as described above.

The processing systems described above may comprise at least one processor and at least one memory including computer program instructions, the at least one memory and the computer program instructions being configured to, with the at least one processor, cause the apparatus at least to perform as described above.

Further features and advantages of the invention will become apparent from the following description of preferred embodiments of the invention, given by way of example only, which is made with reference to the accompanying drawings.

DETAILED DESCRIPTION

"Wireless devices" include in general any device capable of connecting wirelessly to a network, and includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The term "user equipment" or UE is often used to refer to wireless devices in general, and particularly mobile wireless devices.

Reference will sometimes be made in this specification to "network", "network control apparatus" and "base station". In this respect, it will be understood that the "network control apparatus" is the overall apparatus that provides for general management and control of the network and connected devices. Such apparatus may in practice be constituted by several discrete pieces of equipment. As a particular example in the context of UMTS (Universal Mobile Telecommunications System), the network control apparatus may be constituted by for example a so-called Radio Network Controller operating in conjunction with one or more Node Bs (which, in many respects, can be regarded as "base stations"). As another example, LTE (Long Term Evolution) makes use of a so-called evolved Node B (eNB) where the RF transceiver and resource management/control functions are combined into a single entity. The term "base station" is used in this specification to include a "traditional" base station, a Node B, an evolved Node B (eNB), or any other access point to a network, unless the context requires otherwise. Moreover for convenience and by convention, the terms "network", "network control apparatus" and "base station" will often be used interchangeably, depending on the context.

In the following, examples of embodiments of the present invention are described with reference to the drawings. For illustrating the present invention, the examples will be described in connection with a cellular communication network based on a 3GPP-type cellular system, such as Universal Mobile Telecommunication System (UMTS). However, it is to be noted that the present invention is not limited to an application using such types of communication system, but is also applicable in other types of communication systems, including for example E-UTRAN and the like.

Figure 1:
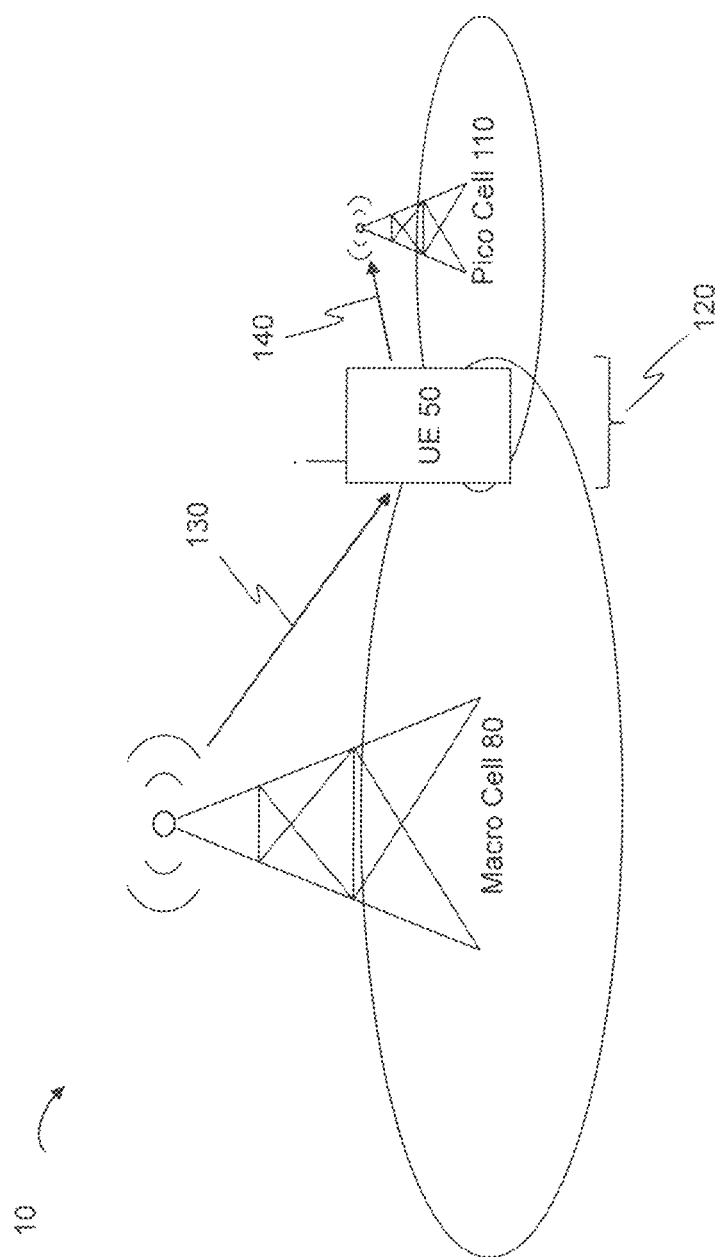
FIG. 1 shows schematically an example of a cellular telecommunications network according to embodiments.

A basic system architecture of a communication network where examples of embodiments are practised may comprise a commonly known architecture of one or more communication networks comprising a wired or wireless access network subsystem and a core network. An example of a cellular telecommunications network 10 according to embodiments will now be described with reference to FIG. 1. In these embodiments, cellular telecommunication network 10 comprises a serving cell 80 that is currently serving a UE 50, one or more neighbouring cells that are neighbours of the serving cell 80 and a radio network controller (RNC) (not shown). Serving cell 80 comprises a base station for serving user equipment within its radio coverage area and in this example comprises a macro cell. The one or more neighbouring cells 110 also comprise base stations or other network nodes for serving user equipment within their radio coverage area and in this example comprises a pico cell 110, but could equally comprise multiple pico cells and/or one or more micro or femto cells or another macro cell.

In this example, cellular telecommunications network 10 comprises a heterogeneous network in which serving call 80 comprises a relatively high power base station or network node and the neighbour cell 110 comprises a relatively low power base station or network node with uplink and/or downlink coverage at least partially overlapping 120 with the macro cell. In these embodiments, serving cell 80 comprises a macro cell 80 and neighbour cell 110 comprises a pico cell 110.

User equipment 50 or another wireless transmit/receive device having a similar function, such as a modem chipset, a chip, a module etc., which can also be part of a user equipment or attached as a separate element to a user equipment, or the like, is able to communicate with the serving cell 80 or neighbour cell 110 via one or more wireless (or "radio") communication channels for transmitting several types of data.

Cellular telecommunications network 10 may additionally be in communication with various mobility management entities (MMEs) (not shown), which facilitate mobility of user equipment across various carriers, and/or network management entities, which manage resources of the communication network 10, for example a radio network controller.

The general functions and interconnections of the described elements, which also depend on the actual network type, are known to those skilled in the art and described in corresponding specifications, so that a detailed description thereof is omitted herein. However, it is to be noted that several additional network elements and signalling links may be employed for a communication connection to or from user equipments, cells, RNCs serving gateways (S-GWs), packet data network gateways (P-GWs), besides those described in detail herein below.

In order to increase the peak data rates per user and make better use of the available network resources, it has for example been proposed to use two or more carriers (in the downlink direction or uplink direction or both) and/or two or more frequencies or bands (again, in the downlink direction or uplink direction or both) and/or two or more data flows (again, in the downlink direction or uplink direction or both). For example, high speed downlink packet access (HSDPA) multiflow (or "multipoint") data transmission was introduced in 3GPP Release 11 (RP-111375) where multiple serving high speed downlink shared channel (HS-DSCH) cells serve packet data to a UE simultaneously. It has also been suggested that HSDPA multiflow operation is introduced over more than one carrier frequency. In multiflow, multiple simultaneous data streams are sent to improve coverage and spectrum usage, and to increase the peak data rates available.

In general, in for example a UMTS or similar wireless systems, wireless devices, such as UEs, perform measurements for, for example, determining link quality in the radio network, and then send the results to the network in the form of UE measurement reports. These measurement reports provide information that is used by the network for dynamic network planning and the distribution of resources at the radio interface. In broad terms and in general, a UE measures characteristics including for example the power on downlink physical channels at the same frequency as the active set (intra-frequency measurements), on downlink physical channels at frequencies that differ from the frequency of the active set (inter-frequency measurements), and on downlink physical channels belonging to another radio access technology than the one currently in use (inter-RAT measurements, where "RAT" is radio access technology). These measurements are used for example to determine which neighbour cell offers the best radio link quality; a connection may then be set up to this cell. Measurements may be carried out by the UE periodically or when triggered by certain events or both.

As a particular example in the case of UMTS, a relevant technical specification for present purposes is TS 25.331 entitled "Radio Resource Control (RRC); Protocol Specification", the entire content of which is incorporated herein by reference. The RRC protocol provides a number of services in supporting the radio/air interfaces. In order to manage connectivity in UMTS, the UTRAN (Universal Mobile Telecommunications System Terrestrial Radio Access Network) requires a UE to perform various measurements in relation to cells, and to report measurement results back to the UTRAN. This is required for various aspects of radio resource management in the UTRAN, such as to define and/or modify the set of active cells to which a UE should have a radio link. A list of RRC services is set out in Section 5.1 of TS 25.331 referenced above and includes for example "UE measurement reporting and control of the reporting". The UTRAN may control a measurement in the UE either by broadcast of system information and/or by transmitting a MEASUREMENT CONTROL message to the UE. A MEASUREMENT CONTROL message may be used to set up, modify or terminate a measurement by the UE. The MEASUREMENT CONTROL message may include data including one or more of (i) measurement type, (ii) measurement objects (e.g. cells to be measured), and (iii) measurement reporting criteria, in particular whether reporting should be periodical or event-triggered.

In general, a UE performs measurements in relation to cells that fall into three categories, namely active set cells, monitored set cells and detected set cells, these being mutually exclusive. The active set cells are a cell or cells that are currently communicating with the UE in supporting a connection and known to the network. In UMTS, these cells are included by the UE in a variable called "CELL_INFO_LIST" which is taken from a neighbour cell list signalled by the UTRAN and which is stored by the UE. The monitored set cells are non-active set cells that are nevertheless known to the network. In UMTS, these cells are also included by the UTRAN in the neighbour cell list and stored by the UE in the CELL_INFO_LIST. The detected set cells are cells that are detected by the UE but which are not known to the network. In UMTS, these cells are neither in the CELL_INFO_LIST nor in the active set. Measurements for detected set cells may be used by the UTRAN in for example configuring a neighbour cell list, which in general includes the active set cells and the monitored set cells. Detected cells can be added to the CELL_INFO_LIST, and to the active set cells, for subsequent monitoring, and will therefore become monitored or active set cells respectively in that case.

The UTRAN may instruct the UE to make intra-frequency measurements of a specified kind by setting a value in an information element (IE) "Intra-frequency measurement quantity", this IE being sent in the MEASUREMENT CONTROL message. The value that is set specifies the measurement that the UE will use in recognising an event. The measurements are generally intended to support continuous communication with the UE as conditions for the UE change, such as may occur because of movement of the UE or a drop in performance of a network access point. Intra-frequency reports may cover for example any one or more of pathloss, received signal code power (RSCP), and the ratio of the received energy per chip (i.e. code bit) and the interference level (Ec/Io). Corresponding IEs for inter-frequency measurements and for inter-RAT measurements may be used in a MEASUREMENT CONTROL message that is sent by the UTRAN to the UE for inter-frequency measurements and for inter-RAT measurements respectively.

As specified in TS25.331, in intra-frequency measurements, the events that the UTRAN can specify to trigger measurement reporting by the UE are:

Event 1a: A Primary CPICH enters the Reporting Range (FDD only)

Event 1b: A Primary CPICH leaves the Reporting Range (FDD only)

Event 1c: A Non-active Primary CPICH becomes better than an active Primary CPICH (FDD only)

Event 1d: Change of best cell (FDD only)

Event 1e: A Primary CPICH becomes better than an absolute threshold (FDD only)

Event 1f: A Primary CPICH becomes worse than an absolute threshold (FDD only)

Event 1g: Change of best cell in TDD

Event 1h: Timeslot ISCP below a certain threshold (TDD only)

Event 1i: Timeslot ISCP above a certain threshold (TDD only)

Event 1j: A Non-active E-DCH but active DCH Primary CPICH becomes better than an active E-DCH Primary CPICH (FDD only)

where TDD is time division duplex and FDD is frequency division duplex, CPICH is the common pilot channel, ISCP is the interference on signal code power, E-DCH is the enhanced uplink DCH, and DCH is the dedicated channel.

As specified in TS25.331, in inter-frequency measurements, the events that the UTRAN can specify to trigger measurement reporting by the UE are:

Event 2a: Change of best frequency

Event 2b: The estimated quality of the currently used frequency is below a certain threshold and the estimated quality of a non-used frequency is above a certain threshold Event 2c: The estimated quality of a non-used frequency is above a certain threshold Event 2d: The estimated quality of the currently used frequency is below a certain threshold Event 2e: The estimated quality of a non-used frequency is below a certain threshold Event 2f: The estimated quality of the currently used frequency is above a certain threshold.

As specified in TS25.331, in inter-RAT measurements, the events that the UTRAN can specify to trigger measurement reporting by the UE are:

Event 3a: The estimated quality of the currently used UTRAN frequency is below a certain threshold and the estimated quality of the other system is above a certain threshold Event 3b: The estimated quality of other system is below a certain threshold Event 3c: The estimated quality of other system is above a certain threshold Event 3d: Change of best cell in other system.

It will be understood that at any particular time one or more of these events may be specified to trigger measurements, and further that other events not mentioned here may be used to trigger measurements, and further that other similar or different events may be relevant for other RATs. Moreover, examples of embodiments of the present invention are not limited to event-triggered measurements and, on the contrary, may be applied additionally and/or alternatively to periodic measurements or one-shot measurements.

An example of a cellular telecommunications network 20 according to embodiments will now be further described with reference to FIG. 2. Cellular telecommunications network 20 comprises a heterogeneous network where a macro cell 280 comprises a relatively high power node (HPN), and pico cell 210 comprises a relatively low power node (LPN) with UL and/or DL coverage at least partially overlapping with the HPN. Network 20 of FIG. 2 may also comprise one or more network control nodes such as RNCs (not shown). In the example network depicted in FIG. 2, the LPN comprises a pico cell, but, alternatively or in addition, may equally comprise another type of LPN such as a micro or femto cell. The HPN of FIG. 2 may use at least one carrier frequency which is the same as at least one carrier frequency of the LPN, i.e. the network may comprise a co-channel heterogeneous network.

Figure 2:
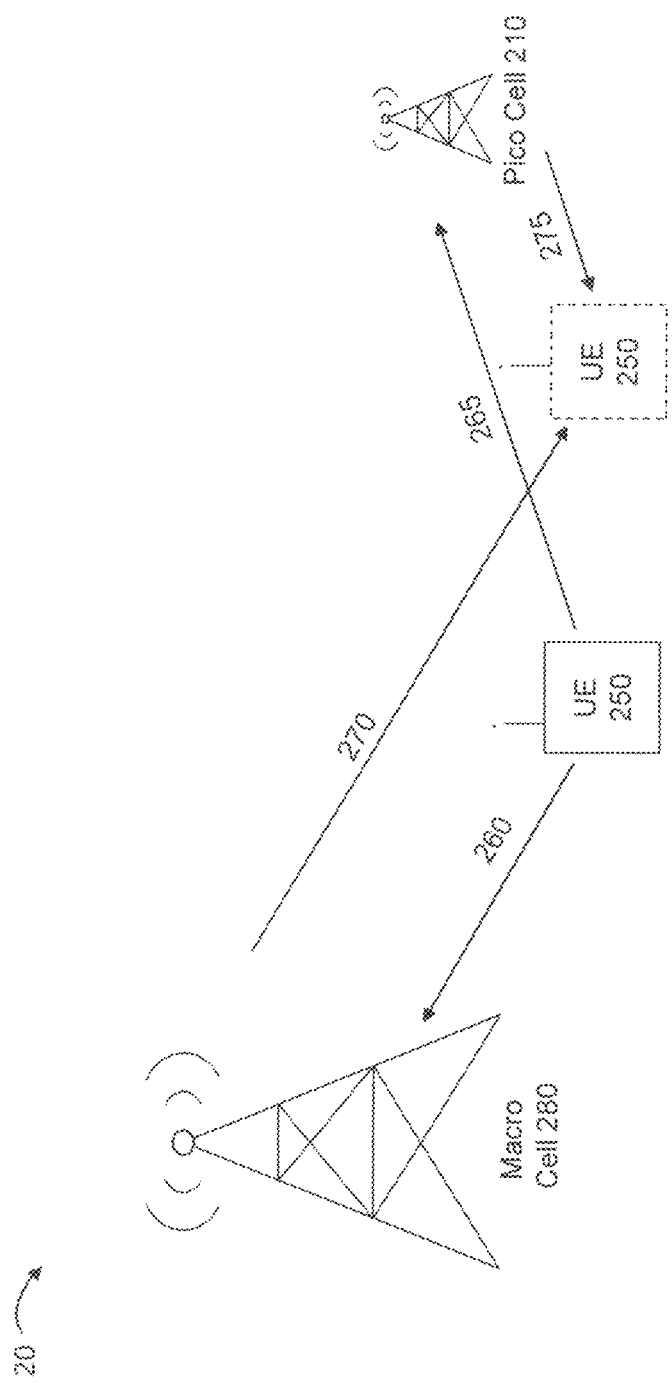
FIG. 2 shows schematically an example of a cellular telecommunications network according to embodiments.

FIG. 2 depicts a situation where an UL/DL imbalance occurs due to transmit power difference between a LPN and a HPN. In particular, FIG. 2 depicts a situation where there is a deviation between an optimal DL multiflow (MF) zone or DL soft handover (SHO) zone and an optimal UL SHO zone, the reasons for which will be explained in the following. The term soft handover (SHO) refers to a handover in which a source cell channel is maintained for a while in parallel with a target cell channel, i.e. a connection to a target cell is established before the connection to a source cell is broken.

In the embodiments of FIG. 2, cellular telecommunication network 20 is a HetNet which comprises a macro (serving) cell 280 that is currently serving a UE 250 and a neighbouring pico cell 210 that is a neighbour of macro cell 280. Macro cell 280 comprises a relatively high power node (HPN) compared to pico cell 210 which comprises a relatively low power node (LPN) with uplink and/or downlink coverage at least partially overlapping with macro cell 280. In practice, cellular telecommunication network 20 would typically contain more neighbouring and/or overlapping cells (for example macro, micro, pico, or femto cells) which are not depicted in FIG. 2.

User equipment 250 is able to communicate with macro cell 280 or pico cell 210 via one or more wireless communication channels. A first instance of UE 250, depicted with a solid line outline has an UL channel 260 to macro cell 280 and an UL channel 265 to pico cell 210. A further instance of UE 250, depicted with a dashed line outline, has a DL channel 270 from macro cell 280 and a DL channel 275 from pico cell 210. Note that two instances of UE 250 are depicted in FIG. 2 for explanatory purposes only; in practice, there would only be a single instance of UE 250. In particular, the two instances of UE 250 (solid and dashed line) are used to depict an optimal UL SHO zone and an optimal DL SHO or DL multiflow (MF) zone respectively.

As known per se, in this respect there are two particular variables that the UE 250 stores, namely the CELL_INFO_LIST variable and the MEASUREMENT_IDENTITY variable. The CELL_INFO_LIST contains a list used to define the cells employed for the three basic types of cell signal measurement (intra frequency, inter frequency and inter-RAT). The MEASUREMENT_IDENTITY contains the measurement configuration information that the UE 250 received from the macro cell 280 in the MEASUREMENT CONTROL message and/or from System Information Block Types 11, 11 bis, 12. Currently, the CELL_INFO_LIST contains cell-specific parameters (such as the primary scrambling code, cell individual offset used for measurements, and the frequency or frequencies on which measurements are to be taken by the UE 250). Likewise, currently, the MEASUREMENT_IDENTITY may contain event-specific parameters (such as reporting threshold, measurement type, and reporting quantities). However, currently, this means that the same parameters from the CELL_INFO_LIST are used by the UE 250 when measuring for any event regardless of the event being measured. Likewise, the same parameters from the MEASUREMENT_IDENTITY are used by the UE 250 when measuring a particular event, regardless of the cell being measured. In effect, therefore, currently the UE has only one CELL_INFO_LIST which is applied for all measurements carried out by the UE 250 for measurement reporting purposes and, likewise, currently the UE has only one set of parameters for a particular event which is applied for all measurements being taken and reported for that event.

As one particular example to illustrate this further, separate measurement reports, for example for Events 1A/B (where a primary CPICH enters/leaves the reporting range respectively), associated with different measurement control configurations may be required to trigger MF and UL SHO respectively. On the other hand, in equations for triggering event 1A/B in existing specification 3GPP TS 25.331, Cell Individual Offset (CIO) is a cell-specific value or parameter that has been used in measurement events related to cell (re)selection, DL MF and UL SHO. This means that event 1A/B would share the same CIO regardless of the purpose for the DL MF or UL SHO, causing suboptimal operation of the system and performance degradation.

In particular and for example, the equation used for event 1A as described in section 14.1.2 of 3GPP TS 25.331 is as follows:

$$10 \cdot \mathrm{Log} M_{New} + CIO_{New} \geq \quad (1)$$

$$W \cdot 10 \cdot \mathrm{Log}\left(\sum_{i=1}^{N_A} M_i\right) + (1 - W) \cdot 10 \cdot \mathrm{Log} M_{Best} - (R_{1a} - H_{1a}/2),$$

where the parameters in equation (1) are defined as follows:
$M_{New}$ is the measurement result of the cell entering the reporting range.
$CIO_{New}$ is the individual cell offset for the cell entering the reporting range if an individual cell offset is stored for that cell. Otherwise it is equal to 0.
$M_i$ is a measurement result of a cell not forbidden to affect reporting range in the active set.
$N_A$ is the number of cells not forbidden to affect reporting range in the current active set.
$M_{Best}$ is the measurement result of the cell not forbidden to affect reporting range in the active set with the highest measurement result, not taking into account any cell individual offset.
W is a parameter sent from UTRAN to UE.
$R_{1a}$ is the reporting range constant.
$H_{1a}$ is the hysteresis parameter for the event 1a.
Here, the measurement result for $M_{New}$, $M_i$ and $M_{Best}$ is CPICH-RSCP.

Returning to the example depicted schematically in FIG. 2, say macro cell 280 has a transmit power of 43 dBm, pico cell 210 has a transmit power of 30 dBm, UL 260 has an X dB pathloss, UL 265 has an X dB pathloss, DL 270 has a Y+13 dB pathloss, and DL 275 has a Y dB pathloss. This leads to an optimal UL SHO zone with similar pathloss for UE 250 (solid line) having a Cell Individual Offset value of between 8 and 13 dB. However, this also leads to an optimal DL SHO or DL MF zone with similar received power for UE 250 (dashed line) having a Cell Individual Offset value of between 0 and 3 dB. In other words, when applying equation (1) for deciding on DL SHO/MF or UL SHO as illustrated in FIG. 2, $CIO_{New}$ can be only optimised for one of these cases and would deviate the other one from the optimal operation. From a DL MF or DL SHO perspective, the optimal $CIO_{New}$ would be set less than 3 dB. However, from an UL SHO perspective, the optimal $CIO_{New}$ should be set to be more than 8 dB when taking into account the effect of the transmit power difference on the measured CPICH-RSCPs. Moreover, optimisation of $CIO_{New}$ for one purpose is not easy since it is also commonly in use for the events that trigger cell selection.

More generally, there are parameters that, currently, are used in common for measuring a certain event regardless of the cell or frequency on which the measurements are to be taken, and, likewise, there are parameters that, currently, are used in common for measuring on a particular cell or frequency regardless of the event for which the measurements are to be taken. This leads to sub-optimal operation and control of the wireless devices, particularly in the case of a HetNet where there are typically at least two network nodes which operate with different transmission powers.

In accordance with one example of an embodiment, for each measurement event set up, the network may configure additional parameters per cell, which in at least some cases may be unique to the measurement event concerned. In other words, plural CELL_INFO_LISTs are in effect constructed, each relating to a different combination of a measurement event and at least one of a cell and a frequency on which measurements are to be taken and each (optionally) including one additional parameter that is specific to that combination. In use, in the UE or other wireless device, any parameters configured for a specific cell/measurement event shall override the values given in the "default" CELL_INFO_LIST which the UE may already have stored. As a result, in one example, a unique CELL_INFO_LIST (combination of neighbour list and associated measurement parameters) may be used for each measurement event being set up. This enables fine tuning of parameters for the scenario to be measured. It also allows for the neighbour list to be different for each event (i.e. containing different frequencies and/or cells).

For example, one measurement event may be set up as usual to perform macro network mobility and uses the default (existing) CELL_INFO_LIST. Another event of the same type may be set up for use in a HetNet scenario and some of the cells may apply different CIO and other parameters (e.g. based on uplink coverage). The event may for example be limited to only some of the cells (e.g. those cells known to be "small" cells). Another event of the same type may be applied to cells outside of the neighbour list (for example uncoordinated closed subscriber group or CSG Cells) and specific parameters may be applied to some or all of the cells outside of the neighbour list.

In addition, a measurement event may be set up such that cells are removed from a CELL_INFO_LIST stored by the wireless device and/or such that cells are added to a CELL_INFO_LIST stored by the wireless device. In addition, the network may configure at least one parameter that is for use in measurement reporting in respect of cells that are not in a CELL_INFO_LIST stored by the wireless device (the so-called detected set cells).

Figure 3:
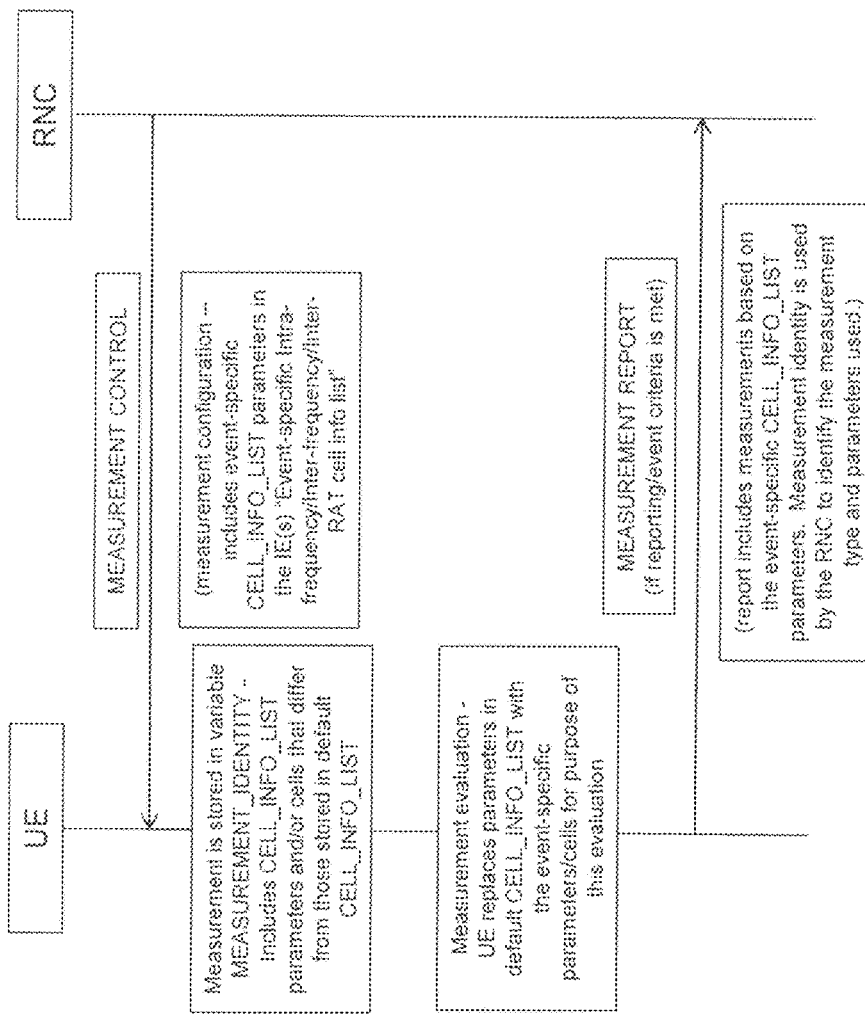
FIG. 3 shows a flow diagram of an example of an embodiment.

Referring to FIG. 3, there is shown a signalling diagram relating to one example of an embodiment. When the network configures a measurement event using a MEASUREMENT CONTROL message, the additional parameter(s) are sent as part of the measurement event configuration. The event-specific parameter or parameters may be provided in a corresponding information element, which may be termed "Event specific Intra-frequency cell info list" or "Inter-frequency cell info list" or "Inter-RAT cell info list" or the like, as the case may be. It may be noted that in general, all of the information elements in the list(s) are optional. This means that in one example, the network only needs to provide the information that differs from that already stored in the default/common/legacy CELL_INFO_LIST which may have been provided by the network previously.

When the UE performs measurement event evaluation for a particular event, it applies the parameters given in the event-specific CELL_INFO_LIST only for this specific measurement event and for the cell and/or frequency on which measurements are to be taken as specified by the network. Thus, the parameters for the measurements can be tailored, and ideally optimised, depending on the measurement event concerned and the cell or frequencies on which measurements for that event are to be taken. This allows a more flexible configuration. For example, measurement events can be set up for specific scenarios and only for a specific set of cells (which may or may not be neighbours stored in the CELL_INFO_LIST). It allows the uplink or downlink coverage, or a combination, to be taken into account better. The tailoring of the parameters as described also allows biasing for, for example, handover or multiflow decisions to be based on for example UE subscription type or other factors. It also allows unusual/specific deployment scenarios to be addressed, for example to allow data traffic to be offloaded or to enable coverage to be extended), or to allow different parameters to be specified for a specific UE (e.g. with a specific subscription type). The same cell can be evaluated using different parameters simultaneously by the same UE and/or different UEs, giving rise to more useful measurement reporting to the network, which in turn allows the network to make better informed decisions about how to handle the UEs that the network is serving or controlling.

Figure 4:
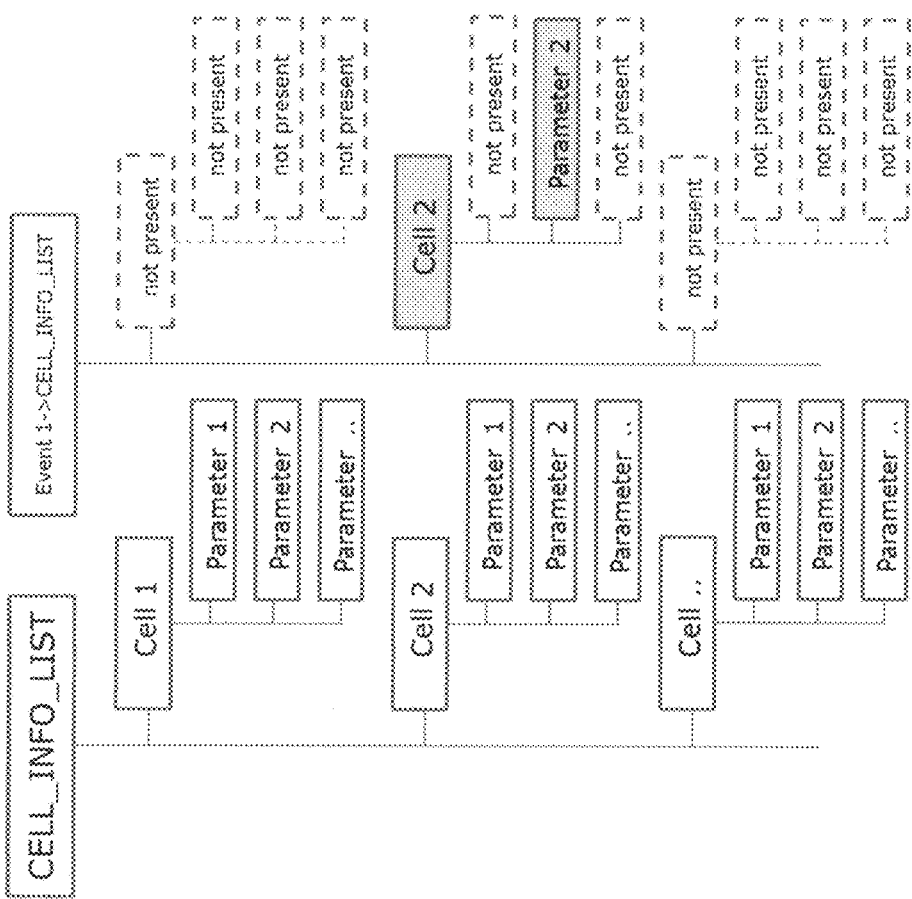
FIG. 4 shows an example of a data structure of an embodiment.

FIG. 4 shows schematically an example of a data structure for storage of this information in the UE. On the left hand side of the figure is shown a data structure for a default CELL_INFO_LIST. In this example shown in FIG. 4, as shown on the right hand side of the figure, the MEASUREMENT CONTROL message received by the UE for the measurement "Event 1" event in effect only replaces Cell2-parameter2 with a new parameter value. In other examples, cells may be added or removed, and multiple parameters can be modified, without affecting the default CELL_INFO_LIST which may be used for other measurements (including idle mode). In certain embodiments, the UE may store a copy of a CELL_INFO_LIST for each event/cell/frequency combination, replacing the relevant parameters from the default CELL_INFO_LIST with the corresponding parameters specified in the MEASUREMENT CONTROL message provided by the network. Alternatively or additionally, the UE may dynamically replace the relevant parameters from the default CELL_INFO_LIST with the corresponding parameters specified in the MEASUREMENT CONTROL message provided by the network (storing the two described structures above) "on-the-fly" when used.

There are a number of parameters which can be specified for a particular combination of a measurement event and cell/frequency on which measurements are to be taken include.

A first example is the CIO (cell individual offset) as discussed above, which is currently used by measurement events in the CELL_DCH state (other than the cell/frequency list itself). In general, using a different CIO for a particular combination of a measurement event and cell/frequency may be of value in any cellular network system, whether a HetNet or not.

In regard to CIO in particular, reference is made to our copending UK patent application no. 1300925.3 filed on even date herewith, the entire content of which is incorporated herein by reference. There is disclosed the use of multiple CIO values which can be used and optimised independently of each other. To optimise the UL SHO and DL MF respectively, a specific CIO value for each is used in embodiments instead of a common CIO value for Event 1A/1B reporting. Thus, according to embodiments described therein, one more CIO value in addition to the existing CIO value is introduced as follows:

Secondary CIO (S_CIO): used for triggering optimal UL SHO reception in the network. It would generally not be used for cell reselection, DL MF or DL SHO.

Further, considering the potential optimisation for DL MF and cell reselection/serving cell change respectively, according to embodiments, another CIO value is introduced as follows:

Third CIO (T_CIO): used to optimise DL MF/SHO operation, whereas the legacy CIO value is used for cell selection and serving cell change.

Whilst also in general being applicable for other cases, and therefore not necessarily limited to the case of a HetNet, for the case of a HetNet in particular an example of another parameter which can be specified for a particular combination of a measurement event and cell/frequency on which measurements are to be taken is "Primary CPICH Tx Power". This is used for pathloss calculations and conventionally has one value for the cell. However, in a HetNet, there may be cells that can operate on different frequencies. Accordingly, there can be advantage in tailoring this parameter so as to make the calculation using CPICH Tx power for the secondary frequency of the cell.

As another example of a parameter which can be specified for a particular combination of a measurement event and cell/frequency on which measurements are to be taken, reference is made to our copending UK patent application no. 1218203.6 filed on 10 Oct. 2012, the entire content of which is incorporated herein by reference. There it is noted that known cell reselection procedures are defined in 3GPP technical specification (TS) 25.304 subclause 5.2.6.1.4. In our copending UK patent application no. 1218203.6, it is disclosed that in embodiments, uplink coverage is also taken into account in cell reselection evaluation (idle mode mobility). Embodiments involve incorporation of a measure of uplink-based coverage, such as an estimate of an UE uplink signal received at the base station. Embodiments involve comparison of the uplink signals between potential neighbour cells in order to determine which cell to camp on, whilst also taking into account downlink-based coverage (as per existing cell reselection evaluation, for example as laid out in subclause 5.2.6.1.4 of TS 25.304 above). Embodiments comprise calculation of one or more modified cell reselection parameters which take UL-based coverage into account; cell reselection evaluation is then carried out on the basis of the modified cell reselection parameters. In an example, the UE calculates a first cell ranking criterion for a serving cell of the user equipment and a second cell ranking criterion for at least one neighbour cell of the user equipment. Calculation of at least one of the first cell ranking criterion for the serving cell and the second cell ranking criterion for the at least one neighbour cell comprises combining a measure of downlink-based coverage and a measure of uplink-based coverage for a respective cell. The UE performs cell reselection evaluation at least on the basis of the calculated first cell ranking criterion and the calculated second cell ranking criterion. In embodiments, the combining comprises adding the measure of downlink-based coverage to the measure of uplink-based coverage. In embodiments, the combining comprises controlling the extent to which the measure of uplink-based coverage for a respective cell affects the cell reselection evaluation. The controlling may comprise multiplying the measure of uplink-based coverage for a respective cell by a weighting factor (herein denoted weighting factor "X") to produce a first product and the combining comprises adding the first product to the measure of downlink-based coverage. The controlling may comprise multiplying the measure of uplink-based coverage for a respective cell by a weighting factor to produce a first product and multiplying the measure of downlink-based coverage for a respective cell by the weighting factor subtracted from 1 to produce a second product and the combining comprises adding the first product to the second product. The weighting factor may for example comprise a value between zero and 1.

Further in our UK patent application no. 1218203.6, it is described that in an example each cell broadcasts a downlink pilot channel signal, such as a common pilot channel (CPICH) Tx power in system information. In embodiments, the UE calculates from this information the pathloss for a cell according to:

Pathloss=CPICH Tx Power (as broadcast by cell)−
CPICH received (measured) power

According to embodiments disclosed in our UK patent application no. 1218203.6, the UE measures a power of at least one signal received from the at least one neighbour cell, and calculates the path loss metric for the at least one neighbour cell on the basis of the measured power and a default value for a neighbour cell pilot channel signal power. Embodiments update the ranking calculation for cell reselection evaluation taking into account the calculate pathloss (PL,s denotes the pathloss for the serving cell; PL,n denotes the pathloss for a neighbour cell) multiplied by a new weighting factor X, for example according to one, the other or both of the following equations:

$$R_s = Q_{meas,s} + Q\mathrm{hyst}_s + Q\mathrm{offmbms} - X*PL,s$$

$$R_n = Q_{meas,n} - Q\mathrm{offset}_{s,n} + Q\mathrm{offmbms} - TO_n*(1-L_n) - X*PL,n$$

where Rs denotes a cell ranking criterion for a serving cell and Rn denotes a cell ranking criterion for a neighbour cell and PL,s is the pathloss of the serving cell, PL,n is the pathloss of a neighbour cell N. The remaining terms (DL-related terms) of these equations are as per subclause 5.2.6.1.4 of TS 25.304 laid out above. A cell ranking criterion may be calculated for multiple neighbour cells. It may be noted that the above equations involve introducing a measure of UL-based coverage into both the cell ranking criterion for the serving cell and the cell ranking criterion for a neighbour cell according to embodiments. However, according to other embodiments, a measure of UL-based coverage may only be introduced into the cell ranking criterion for one or the other of the serving cell and a neighbour cell. Similarly, in the equations above, weighting factor X is indicated as being applied to both the cell ranking criterion for the serving cell and the cell ranking criterion for a neighbour cell according to embodiments, but according to other embodiments, weighting factor X is only applied to one or the other of the cell ranking criterion for the serving cell and the cell ranking criterion for a neighbour cell.

In embodiments disclosed in our UK patent application no. 1218203.6, the weighting factor X is applied such that the effect of the downlink measurements becomes less as the weighting factor X moves towards 1, for example according to one or more of the following cell ranking criterion equations:

$$R_s = (1-X)Q_{meas,s} + Q\mathrm{hyst}_s + Q\mathrm{offmbms} - X*PL,s$$

$$R_n = (1-X)Q_{meas,n} - Q\mathrm{offset}_{s,n} + Q\mathrm{offmbms} - TO_n*(1-L_n) - X*PL,n$$

Returning to the discussion of examples of parameters which can be specified for a particular combination of a measurement event and cell/frequency on which measurements are to be taken as described herein, another example of such a parameter is the weighting factor X discussed above and more fully in our UK patent application no. 1218203.6. In embodiments, the weighting factor X is determined by the network. In embodiments, the weighting factor X is received by the UE from the serving cell. In embodiments, the weighting factor X is received by the UE from the at least one neighbour cell.

Yet further examples of parameters which can be specified for a particular combination of a measurement event and cell/frequency on which measurements are to be taken include other parameters in the CELL_INFO_LIST that are used for cell reselection, such as Qrxlevmin (the minimum required received signal value in the cell, in dBm), Qqualmin (the minimum required quality level in the cell, in dB), and Maximum allowed UL Tx power. One or more of these can be used in for example connected mode measurements and modified for a specific event as described herein.

Figure 5:
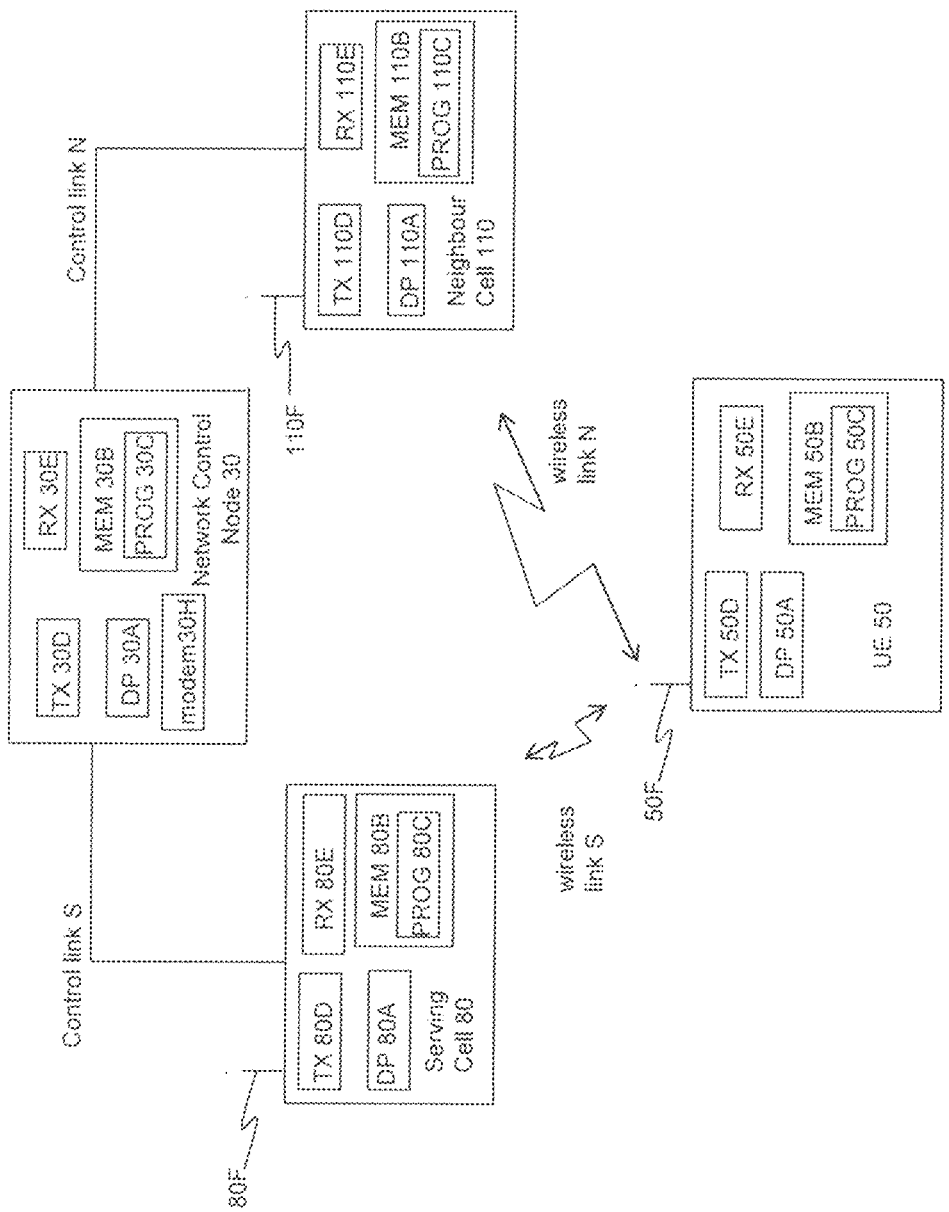
FIG. 5 shows a simplified block diagram of various devices which are example electronic devices suitable for use in practising embodiments.

Reference is now made to FIG. 5 for illustrating a simplified block diagram of various electronic devices and apparatus that are suitable for use in practising embodiments of the present invention. In FIG. 5, serving cell 80 is adapted for communication over a wireless link S with a UE 50, such as a mobile terminal. Similarly, a neighbour cell 110 is adapted for communication over a wireless link N with UE 50. Serving cell 80 and/or neighbour cell 110 each may comprise a macro Node B, an eNodeB, a remote radio head, relay station, a femto cell or home NodeB, or other type of base station/cellular network access node.

UE 50 may include processing means such as a processing system and/or at least one data processor (DP) 50A, storing means such as at least one computer-readable memory (MEM) 50B storing at least one computer program (PROG) 50C, and also communicating means such as a transmitter TX 50D and a receiver RX 50E for bidirectional wireless communications with the serving cell 80 and/or neighbour cell 110 and/or any other neighbouring cells (not shown) via one or more antennas 50F. Note that embodiments may be carried out by apparatus such as a modem that does not comprise an antenna.

Serving cell 80 includes its own processing means such as a processing system and/or at least one data processor (DP) 80A, storing means such as at least one computer-readable memory (MEM) 80B storing at least one computer program (PROG) 80C, and communicating means such as a transmitter TX 80D and a receiver RX 80E for bidirectional wireless communications with other devices under its control via one or more antennas 80F. There is a data and/or control path, termed at FIG. 5 as a control link S which in the 3GPP cellular system may be implemented as an Iub interface or in E-UTRAN as an S1 interface, coupling the serving cell 80 with network entity 30, and over which the network entity 30 and the serving cell 80 may exchange control messages, such as system information update requests and/or change notifications. Network control node 30 may for example comprise an RNC, MME or suchlike Similarly, neighbour cell 110 includes its own processing means such as a processing system and/or at least one data processor (DP) 110A, storing means such as at least one computer-readable memory (MEM) 110B storing at least one computer program (PROG) 110C, and communicating means such as a transmitter TX 110D and a receiver RX 110E for bidirectional wireless communications with other devices under its control via one or more antennas 110F. There is a data and/or control path, termed at FIG. 5 as a control link N which in the 3GPP cellular system may be implemented as an Iub interface or in E-UTRAN as an S1 interface, coupling the neighbour cell 110 with network entity 30, and over which network entity 30 and the neighbour cell 110 may exchange control messages, such as system information update requests and/or change notifications.

Network control node 30 includes processing means such as a processing system and/or at least one data processor (DP) 30A, storing means such as at least one computer-readable memory (MEM) 30B storing at least one computer program (PROG) 30C, and communicating means such as a modem 30H for bidirectional communication with serving cell 80 over control link S or with neighbour cell 110 over control link N.

While not particularly illustrated for UE 50, serving cell 80, neighbour cell 110 and network control node 30, those devices are also assumed to include as part of their wireless communicating means a modem which may be inbuilt on a RF front end chip within those devices 50, 80, 110 30 and which chip also carries the TX 50D/80D/110D/30D and the RX 50E/80E/110E/30E.

At least one of the PROGs 50C in UE 50 is assumed to include program instructions that, when executed by the associated DP 50A, enable the device to operate in accordance with embodiments of the present invention, as detailed above.

Serving cell 80, neighbour cell 110 and network control node 30 also have software stored in their respective MEMs to implement certain aspects of these teachings. In these regards, embodiments may be implemented at least in part by computer software stored on the MEM 50B, 80B, 110B, 30B which is executable by the DP 50A of UE 50, DP 80A of serving cell 80, DP 110A of neighbour cell 110 and/or DP 30A of network entity 30, or by hardware, or by a combination of tangibly stored software and hardware (and tangibly stored firmware). Electronic devices implementing these aspects of the invention need not be the entire devices as depicted at FIG. 5, but embodiments may be implemented by one or more components of same such as the above described tangibly stored software, hardware, firmware and DP, or a system-on-a-chip SOC, an application-specific integrated circuit ASIC or a digital signal processor DSP or the like.

Various embodiments of the computer readable MEMs 50B, 80B, 110B and 30B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 50A, 30A, 110A and 80A include but are not limited to general purpose computers, special purpose computers, microprocessors, digital signal processors (DSPs) and multi-core processors.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for use in measurement reporting in a cellular telecommunications network, the method comprising:
   generating, with circuitry, a measurement control message that is hierarchically structured and that specifies at least one measurement event for configuring reporting of measurements by at least one wireless device operating in a cell of the cellular telecommunications network;
   wherein the at least one measurement event includes one neighbor list that is specific to the at least one measurement event out of a plurality of available neighbor lists, each of the plurality of available neighbor lists identifying a combination of a measurement event and at least one of a cell or a frequency on which measurement is to be performed, each of the plurality of available neighbor lists including parameters specific to the combination identified therein; and
   transmitting, with the circuitry, the measurement control message for receipt by the wireless device.

2. An apparatus for use in measurement reporting in a cellular telecommunications network, the apparatus comprising:
   circuitry configured to
   generate a measurement control message that is hierarchically structured and that specifies at least one measurement event for configuring reporting of measurements by at least one wireless device operating in a cell of the cellular telecommunications network;
   wherein the at least one measurement event includes one neighbor list that is specific to the at least one measurement event out of a plurality of available neighbor lists, each of the plurality of available neighbor lists identifying a combination of a measurement event and at least one of a cell or a frequency on which measurement is to be performed, each of the plurality of available neighbor lists including parameters specific to the combination identified therein; and
   cause the measurement control message to be transmitted for receipt by the wireless device.

3. The apparatus according to claim 2, wherein the neighbor list is disposed at a first level of the hierarchical structure of the measurement control message, and the at least one measurement event includes at least one parameter that is specific to the at least one measurement event and that is disposed at a second level of the hierarchical structure of the measurement control message.

4. The apparatus according to claim 2, wherein the circuitry is further configured to generate a measurement control message by configuring the measurement event with a neighbor list that causes cells to be removed from a cell info list stored by a wireless device that receives the measurement control message.

5. The apparatus according to claim 2, wherein the circuitry is further configured to generate a measurement control message by configuring the measurement event with a neighbor list that causes cells to be added to a cell info list stored by a wireless device that receives the measurement control message.

6. The apparatus according to claim 2, wherein the circuitry is further configured to generate a measurement control message by configuring the measurement event with at least one parameter that is for use in measurement reporting in respect of cells that are not in a cell info list stored by a wireless device that receives the measurement control message.

7. The apparatus according to claim 2, wherein the circuitry is further configured to generate a measurement control message by generating a measurement control message that specifies plural measurement events for configuring reporting of measurements, wherein a first of said measurement events includes a neighbor list that is specific to said first measurement event, and a second of said measurement events includes another neighbor list that is specific to said second measurement event.

8. The apparatus according to claim 7, wherein said first measurement event is further configured with at least one parameter that is specific to said first measurement event and said second measurement event is further configured with at least one parameter that is specific to said second measurement event.

9. The apparatus according to claim 2, wherein the measurement control message comprises an information element that comprises at least one of (i) at least one event-specific parameter, (ii) a list of frequencies, and (iii) a list of cells, for at least one of intra-frequency measurements, inter-frequency measurements and inter-radio access technology measurements.

10. The apparatus according to claim 2, wherein the parameter includes at least one of cell individual offset, primary common pilot channel transmit power, a weighting factor, a minimum required received signal value in the cell, a minimum required quality level in the cell, and a maximum allowed uplink transmit power.

11. An apparatus for use in measurement reporting in a cellular telecommunications network, the apparatus comprising
   circuitry configured to
   receive a measurement control message that is hierarchically structured and that specifies at least one measurement event for configuring reporting of measurements by at least one wireless device operating in a cell of the cellular telecommunications network;
   the at least one measurement event including one neighbor list that is specific to the at least one measurement event out of a plurality of available neighbor lists, each of the plurality of available neighbor lists identifying a combination of a measurement event and at least one of a cell or a frequency on which measurement is to be performed, each of the plurality of available neighbor lists including parameters specific to the combination identified therein; and
   carry out measurements according to the at least one measurement event.

12. The apparatus according to claim 11, wherein the neighbor list is disposed at a first level of the hierarchical structure of the measurement control message, and the at least one measurement event includes at least one parameter that is specific to the at least one measurement event and that is disposed at a second level of the hierarchical structure of the measurement control message.

13. The apparatus according to claim 11, wherein the measurement control message comprises a neighbor list that causes the circuitry to remove cells from a cell info list stored by the wireless device.

14. The apparatus according to claim 11, wherein the measurement control message comprises a neighbor list that causes the circuitry to add cells a cell info list stored by a wireless device.

15. The apparatus according to claim 11, wherein the measurement control message comprises at least one parameter used by the circuitry in measurement reporting in respect of cells that are not in a cell info list stored by the wireless device.

16. The apparatus according to claim 11, wherein the measurement control message specifies plural measurement events for configuring reporting of measurements, wherein a first of said measurement events includes a neighbor list that is specific to said first measurement event, and a second of said measurement events includes another neighbor list that is specific to said second measurement event.

17. The apparatus according to claim 16, wherein said first measurement event is further includes at least one parameter that is specific to said first measurement event and said second measurement event includes at least one parameter that is specific to said second measurement event.

18. The apparatus according to claim 11, wherein the measurement control message comprises an information element that comprises at least one of (i) at least one event-specific parameter, (ii) a list of frequencies, and (iii) a list of cells, for at least one of intra-frequency measurements, inter-frequency measurements and inter-radio access technology measurements.

19. The apparatus according to claim 11, wherein the parameter includes at least one of cell individual offset, primary common pilot channel transmit power, a weighting factor, a minimum required received signal value in the cell, a minimum required quality level in the cell, and a maximum allowed uplink transmit power.

\* \* \* \* \*